(12) United States Patent
Schmid et al.

(10) Patent No.: US 8,708,786 B2
(45) Date of Patent: Apr. 29, 2014

(54) AIRCRAFT AIR-CONDITIONING SYSTEM WITH A REDUCED RISK OF ICING

(75) Inventors: Martin Schmid, Hamburg (DE); Dariusz Krakowski, Buxtehude (DE); Michael Markwart, Halstenbek (DE); Joerg Baumann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1161 days.

(21) Appl. No.: 12/646,224

(22) Filed: Dec. 23, 2009

(65) Prior Publication Data

US 2010/0173576 A1 Jul. 8, 2010

Related U.S. Application Data

(60) Provisional application No. 61/142,420, filed on Jan. 5, 2009.

(30) Foreign Application Priority Data

Jan. 5, 2009 (DE) .......................... 10 2009 003 937

(51) Int. Cl.
*B64D 13/00* (2006.01)
*B64D 13/08* (2006.01)

(52) U.S. Cl.
USPC .................................. 454/71; 454/76; 454/77

(58) Field of Classification Search
CPC ........... B64D 13/06; B64D 2013/0648; B64D 2013/064; B64D 2013/0666; B64D 2013/0688
USPC ................. 137/599.01, 561 A; 454/71, 76, 77
See application file for complete search history.

(56) References Cited

U.S. PATENT DOCUMENTS

| | | | | |
|---|---|---|---|---|
| 2,858,075 A | * | 10/1958 | May, Jr. et al. | 236/13 |
| 3,208,234 A | * | 9/1965 | Messinger | 62/172 |
| 4,430,867 A | * | 2/1984 | Warner | 62/402 |
| 4,445,342 A | * | 5/1984 | Warner | 62/172 |
| 5,121,610 A | * | 6/1992 | Atkinson et al. | 62/151 |
| 2003/0141412 A1 | * | 7/2003 | Fieldson et al. | 244/118.5 |
| 2003/0189132 A1 | * | 10/2003 | Brady et al. | 244/118.5 |
| 2009/0032330 A1 | | 2/2009 | Holmgren et al. | |

FOREIGN PATENT DOCUMENTS

| | | | | |
|---|---|---|---|---|
| DE | 1105731 | * | 4/1961 | ............ B64D 13/08 |
| DE | 2640265 | | 3/1977 | |
| DE | 102006018404 | | 10/2007 | |
| DE | 102006037539 | | 2/2008 | |
| GB | 1561979 | | 3/1980 | |
| WO | WO2005030582 | | 4/2005 | |
| WO | WO2008017427 | * | 2/2008 | ............ B64D 13/08 |

* cited by examiner

*Primary Examiner* — John K Fristoe, Jr.
*Assistant Examiner* — Frederick D Soski
(74) *Attorney, Agent, or Firm* — Wood, Herron & Evans, LLP

(57) ABSTRACT

An aircraft air-conditioning system includes an air-conditioning unit that is connected by a main fresh-air line to a mixer in order to supply the mixer with fresh air at a desired low temperature. A fresh-air branch line that is connected upstream of the mixer to the main fresh-air line has a flow cross section that is smaller than a flow cross section of the main fresh-air line. In a region of connection of the main fresh-air line to the fresh-air branch line the main fresh-air line and the fresh-air branch line are so formed that a main fresh air flow flowing through the main fresh-air line is deflected, while a fresh air branch flow flowing through the fresh-air branch line experiences substantially no deflection.

15 Claims, 3 Drawing Sheets

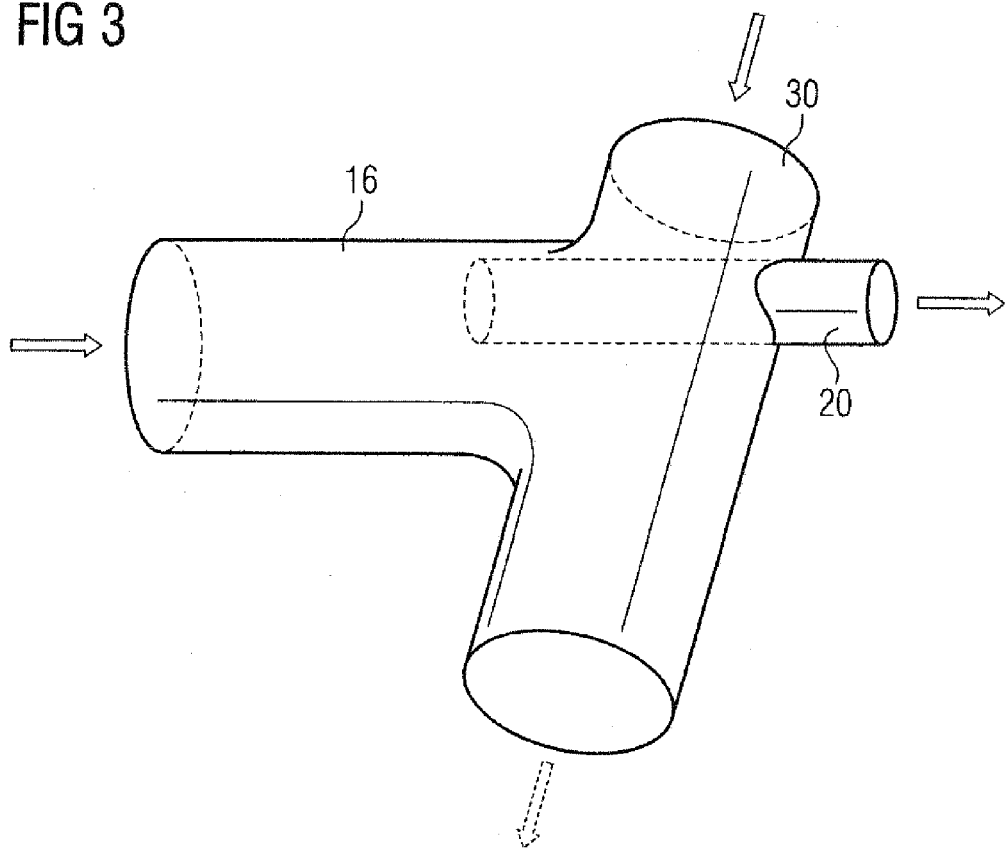

AIRCRAFT AIR-CONDITIONING SYSTEM WITH A REDUCED RISK OF ICING

TECHNICAL FIELD

The present invention relates to an aircraft air-conditioning system with a reduced risk of icing in a region of connection of a main fresh-air line to a fresh-air branch line.

BACKGROUND

In a modern passenger aircraft the passenger cabin or sub-regions of the passenger cabin, the hold or sub-regions of the hold, the cockpit and the crew restrooms form various air-conditioning zones that are conventionally air-conditioned both during cruising and during operation of the aircraft on the ground by means of an onboard air-conditioning system. The aircraft air-conditioning system is supplied with hot bleed air under increased pressure that is removed from the engine compressors or auxiliary engine compressors. In the air-conditioning units, the so-called air-conditioning packs of the aircraft air-conditioning system, the bleed air is expanded and is cooled to a desired low temperature. Finally, the air conditioned in the air-conditioning units is directed as cooled fresh air into a main fresh-air line of the air-conditioning system. The fresh air flowing through the main fresh-air line is conveyed into a mixer, where it is mixed with recirculated air extracted from the passenger cabin. The mixed air produced in the mixer from cold fresh air provided by the air-conditioning packs and from recirculated air extracted from the aircraft cabin is finally used to air-condition the various air-conditioning zones of the aircraft.

In order to allow individual air-conditioning zones of the aircraft, for example a hold region or the cockpit, to be air-conditioned individually independently of recirculated air, fresh air has to be removed upstream of the mixer from the main fresh-air line of the aircraft air-conditioning system. Conventionally, a fresh-air branch line that branches off upstream of the mixer from the main fresh-air line is used for this purpose. In a fresh-air branch line branching off from the main fresh-air line, however, regions where a fresh air branch flow directed through the fresh-air branch line has a reduced flow rate usually occur. As a result, in the event of a corresponding temperature and a corresponding moisture content of the fresh air, the attachment of ice and snow to the lines of the air-conditioning system is promoted in the region where the fresh-air branch line branches off from the main fresh-air line. The smaller the cross section of flow of the fresh-air branch line, the greater the risk of icing in the region where the fresh-air branch line branches off from the main fresh-air line.

From DE 10 2006 037 539 A1 it is known for fresh-air lines, through which cold fresh air from the air-conditioning units of an aircraft air-conditioning system flows, to be protected against icing by means of a supply of warm engine bleed air that is controlled by trimming valves. However, as a result of the supply of warm engine bleed air into the fresh-air lines the cooling capacity of the air-conditioning system is reduced. Furthermore, the trimming valves needed to control the supply of engine bleed air into the fresh-air lines are relatively susceptible to faults. This leads to an increased outlay for maintenance as a failure of the trimming valves would result in impairment of the operation of the aircraft.

SUMMARY OF THE INVENTION

The invention is directed to the object of indicating an aircraft air-conditioning system with a reduced risk of icing in a region of connection of a main fresh-air line to a fresh-air branch line.

In order to achieve this object, an aircraft air-conditioning system according to the invention comprises an air-conditioning unit that is connected by a main fresh-air line to a mixer in order to supply the mixer with fresh air at a desired low temperature. A fresh-air branch line having a flow cross section that is smaller than a flow cross section of the main fresh-air line is connected upstream of the mixer to the main fresh-air line. In a region of connection of the main fresh-air line to the fresh-air branch line the main fresh-air line and the fresh-air branch line are so formed that a main fresh air flow flowing through the main fresh-air line is deflected, while a fresh air branch flow flowing through the fresh-air branch line experiences substantially no deflection. In other words, the fresh-air branch line extends substantially in the direction of the main fresh air flow through the main fresh-air line upstream of the region of connection of the main fresh-air line to the fresh-air branch line, while the main fresh-air line is of a curved design relative to the flow direction of the main fresh air flow through the main fresh-air line upstream of the region of connection of the main fresh-air line to the fresh-air branch line.

By virtue of the development according to the invention of the main fresh-air line and the fresh-air branch line in the region of connection of the main fresh-air line to the fresh-air branch line, the effect that arises in prior art aircraft air-conditioning systems, namely that in a fresh-air branch line branching off from a main fresh-air line regions where a fresh air branch flow directed through the fresh-air branch line has a reduced flow rate occur, is avoided or at least sharply reduced. This lowers the risk of ice and/or snow attaching in the interior of the fresh-air branch line. As the main fresh-air line compared to the fresh-air branch line has a larger flow cross section, in the main fresh-air line the risk of icing is markedly lower than in the fresh-air branch line. Regions that have a reduced flow rate of the main fresh air flow directed through the main fresh-air line and occur as a result of the deflection of the main fresh air flow in the region of connection of the main fresh-air line to the fresh-air branch line therefore have a much lower influence upon the risk of icing than the occurrence of such regions with a reduced flow rate in the fresh-air branch line. The—in terms of flow—advantageous design of the region of connection of the main fresh-air line to the fresh-air branch line therefore makes it possible markedly to reduce the risk of icing in the region of connection of the main fresh-air line to the fresh-air branch line.

The main fresh-air line of the aircraft air-conditioning system according to the invention may comprise merely a line branch. The region of connection of the main fresh-air line to the fresh-air branch line may then, as already described, be designed in such a way that the fresh-air branch line extends in a direction that corresponds substantially to the direction of the main fresh air flow through the main fresh-air line upstream of the region of connection of the main fresh-air line to the fresh-air branch line. The main fresh-air line, on the other hand, follows a curve in the region of connection of the main fresh-air line to the fresh-air branch line.

It is however also possible for the main fresh-air line in the region of connection of the main fresh-air line to the fresh-air branch line to branch into a first main fresh-air line branch and a second main fresh-air line branch. The first main fresh-air line branch and the second main fresh-air line branch are then preferably so formed that the main fresh air branch flows flowing through the main fresh-air line branches are deflected in the region of connection of the main fresh-air line to the fresh-air branch line. In contrast thereto, the fresh air branch flow flowing through the fresh-air branch line experiences no deflection, i.e. the direction of the fresh air branch flow in the fresh-air branch line corresponds substantially to the direction of the main fresh air flow through the main fresh-air line upstream of the region of connection of the main fresh-air line to the fresh-air branch line. In order once again to guarantee the desired reduction of the risk of icing in the region of connection of the main fresh-air line to the fresh-air branch line, the first main fresh-air line branch and the second main fresh-air line branch each have a flow cross section that is greater than the flow cross section of the fresh-air branch line.

The aircraft air-conditioning system according to the invention preferably further comprises a heating device, which is adapted to heat the main fresh-air line and/or the fresh-air branch line in the region of connection of the main fresh-air line to the fresh-air branch line. By virtue of the provision of a heating device it may be ensured that, even in operating phases of the aircraft air-conditioning system when for example the aircraft air-conditioning system is being operated under critical ambient conditions or in a critical temperature range, icing in the region of connection of the main fresh-air line to the fresh-air branch line may be reliably avoided.

The aircraft air-conditioning system according to the invention may further comprise a control unit, which is adapted to control the heating device in dependence on at least one measured parameter that indicates icing of the region of connection of the main fresh-air line to the fresh-air branch line. For this purpose, the control unit may be connected to appropriate sensors. The measured parameter may be a parameter that is characteristic of the static pressure in the main fresh-air line and/or of the static pressure in the fresh-air branch line. Measuring of the static pressure may be used to detect icing of the region of connection of the main fresh-air line to the fresh-air branch line as the attachment of ice and/or snow in the main fresh-air line and/or the fresh-air branch line immediately leads to a rise of the static pressure upstream of the relevant pipe section.

Alternatively or in addition thereto, the control unit may be adapted to use the temperature in a region of the aircraft that is connected to the main fresh-air line and/or the fresh-air branch line downstream of the region of connection of the main fresh-air line to the fresh-air branch line as a parameter for detecting icing of the region of connection of the main fresh-air line to the fresh-air branch line. For example, in the critical temperature range of −10° C. to 0° C. the constant temperature of a temperature sensor at 0° C. may be an indication of icing on the sensor and in the pipe.

Preferably, the control unit starts operation of the heating device if at least one measured value of a parameter, which is being monitored by the control unit to detect icing of the region of connection of the main fresh-air line to the fresh-air branch line, exceeds a predetermined threshold value. If the measured value of the parameter being monitored to detect icing of the region of connection of the main fresh-air line to the fresh-air branch line drops back down below the threshold value, the control unit may terminate operation of the heating unit. Alternatively or in addition thereto, the control unit may provide a periodic operation of the heating device, i.e. start the heating device after a specific time interval without heating has elapsed and then switch off the heating device after a heating period has elapsed.

The heating device may comprise an engine bleed-air line, which downstream of the air-conditioning unit and upstream of the region of connection of the main fresh-air line to the fresh-air branch line is connected to the main fresh-air line in order to supply warm engine bleed air to the main fresh-air line. Control of the supply of warm engine bleed air from the engine bleed-air line into the main fresh-air line may so be effected by means of a valve disposed in the engine bleed-air line. Heating the region of connection of the main fresh-air line to the fresh-air branch line by supplying warm engine bleed air into the main fresh-air line makes it possible reliably to avoid and/or eliminate icing of the region of connection of the main fresh-air line to the fresh-air branch line. During the heating periods the aircraft air-conditioning is system however delivers a reduced cooling capacity, which may lead to a deterioration of comfort for the passengers and crew on board the aircraft. Furthermore, during the heating periods ice that has attached in the region of connection of the main fresh-air line to the fresh-air branch line may detach itself and damage downstream components of the air-conditioning system and/or even be carried into the passenger cabin. The time interval between the heating periods should be kept as short as possible to prevent the formation and detachment of larger fragments.

As an alternative or in addition to a heating device comprising an engine bleed-air line, the aircraft air-conditioning system according to the invention preferably comprises a heating device that enables purposeful and locally selective heating of the region of connection of the main fresh-air line to the fresh-air branch line. In other words, the heating device is preferably designed in such a way that it allows a purposeful supply of thermal energy to the, in terms of the risk of icing, critical region of connection of the main fresh-air line to the fresh-air branch line. For example, the heating device may be an electric heating device, which for releasing thermal energy to the region of connection of the main fresh-air line to the fresh-air branch line is disposed adjacent to the region of connection of the main fresh-air line to the fresh-air branch line.

Alternatively or in addition thereto, the heating device for purposeful and locally selective heating of the region of connection of the main fresh-air line to the fresh-air branch line may comprise a line, through which a heat transfer fluid may flow. The fresh-air branch line may then in the region of connection of the main fresh-air line to the fresh-air branch line extend through the line, through which a heat transfer fluid may flow, thereby enabling an unimpeded heat transfer from the line, through which a heat transfer fluid may flow, to the fresh-air branch line. A heating device comprising a line, through which a heat transfer fluid may flow, may be controlled by controlling the supply of heat transfer fluid into the line, for example by means of a suitable valve. The line, through which a heat transfer fluid may flow, may be for example an engine bleed-air line or a line that removes waste heat from a heat-generating component on board the aircraft.

The line, through which a heat transfer fluid may flow, is however preferably a recirculated-air line for recirculating filtered cabin air of the aircraft. The use of waste heat of a heat-generating component on board the aircraft or the use of the thermal energy contained in the recirculated air removed from the passenger cabin of the aircraft to heat the region of connection of the main fresh-air line to the fresh-air branch line is particularly energy-efficient as it is possible to dispense with the provision of an additional energy source, such as is needed for example to operate an electric heating device.

The line, through which a heat transfer fluid may flow, may open out into the main fresh-air line in the region of connection of the main fresh-air line to the fresh-air branch line. Given such an arrangement, a mixture of fresh air and heat transfer fluid flows through the main fresh-air line downstream of the region of connection of the main fresh-air line to the fresh-air branch line. This is particularly unproblematic if the line, through which a heat transfer fluid may flow, is a recirculated-air line for recirculating filtered cabin air of the aircraft.

In the region of connection of the main fresh-air line to the fresh-air branch line the fresh-air branch line may be uninsulated, i.e. not provided with an insulating sheath. This guarantees an optimized input of the heat generated by a heating device into the region of connection of the main fresh-air line to the fresh-air branch line. Heating of the fresh-air branch line is particularly efficient if it is manufactured from a heat-conducting material, such as for example metal.

The aircraft air-conditioning system according to the invention may further comprise a control unit, which is adapted to control the operation of the air-conditioning unit and/or the supply of warm air into the main fresh-air line downstream of the air-conditioning unit and upstream of the region of connection of the main fresh-air line to the fresh-air branch line in such a way that the temperature of the air flowing through the region of connection of the main fresh-air line to the fresh-air branch line does not fall below a first predetermined temperature value.

The first predetermined temperature value is preferably in the range between 0° C. and 5° C. By controlling the temperature of the air flowing through the region of connection of the main fresh-air line to the fresh-air branch line in such a way that this temperature does not fall below 0° C. to 5° C., icing of the region of connection of the main fresh-air line to the fresh-air branch line is reliably prevented. Such temperature control however usually requires a higher volume rate of fresh air flow to provide a desired cooling capacity of the aircraft air-conditioning system. Furthermore, occasionally the cooling capacity of the aircraft air-conditioning system may not be sufficient to avoid an impairment of comfort for the passengers and crew on board the aircraft. If possible, therefore, the temperature of the air flowing through the region of connection of the main fresh-air line to the fresh-air branch line should be controlled to prevent it falling below 0° C. to 5° C. only in operating phases of the aircraft air-conditioning system that are particularly critical with regard to a risk of icing of the region of connection of the main fresh-air line to the fresh-air branch line.

The aircraft air-conditioning system according to the invention may further comprise a control unit, which is adapted to control the operation of the air-conditioning unit and/or the supply of warm air into the main fresh-air line downstream of the air-conditioning unit and upstream of the region of connection of the main fresh-air line to the fresh-air branch line in such a way that the temperature of the air flowing through the region of connection of the main fresh-air line to the fresh-air branch line does not exceed a second predetermined temperature value. The aircraft air-conditioning system according to the invention preferably comprises a control unit, which is devised, depending upon requirements, to control the temperature of the air flowing through the region of connection of the main fresh-air line to the fresh-air branch line in such a way that the temperature neither falls below the first predetermined temperature value nor exceeds the second predetermined temperature value.

The second predetermined temperature value is preferably in the range between −15° C. and −10° C. If the aircraft air-conditioning system is operated in such a way that the temperature of the air flowing through the region of connection of the main fresh-air line to the fresh-air branch line lies between −15° C. and −10° C., the air-conditioning unit is capable of removing 75% of the moisture, which is contained in the air supplied to the air-conditioning system, from the air. The fresh air flowing through the region of connection of the main fresh-air line to the fresh-air branch line then consequently has a relatively low moisture content, thereby reducing the risk of icing in this region. If the temperature of the air flowing through the region of connection of the main fresh-air line to the fresh-air branch line is controlled in such a way that it does not exceed a value of −15° C. to −10° C., a relatively large quantity of warm engine bleed air has to be supplied to the fresh air downstream of the region of connection of the main fresh-air line to the fresh-air branch line in order to avoid an impairment of comfort for the passengers and crew on board the aircraft. Supply of the warm engine bleed air is effected with the aid of valves that are possibly susceptible to faults. For these reasons, the temperature of the air flowing through the region of connection of the main fresh-air line to the fresh-air branch line should be controlled to prevent it exceeding −15° C. to −10° C. as far as possible only in operating phases of the aircraft air-conditioning system, which are critical with regard to a risk of icing of the region of connection of the main fresh-air line to the fresh-air branch line and in which high cooling capacity requirements are demanded of the air-conditioning system.

BRIEF DESCRIPTION OF THE DRAWINGS

Preferred embodiments of the invention are now described in detail with reference to the accompanying diagrammatic drawings, which show in.

DETAILED DESCRIPTION

Figure 1:
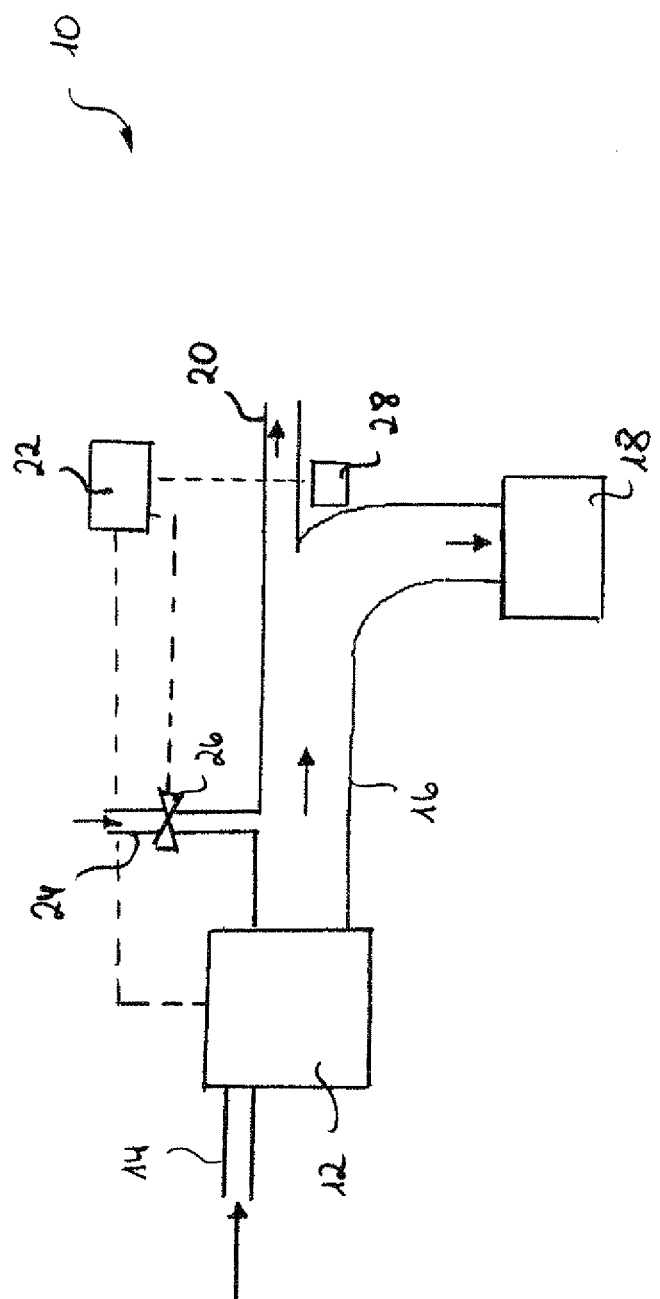
FIG. 1 a detail of a first embodiment of an aircraft air-conditioning system.

FIG. 1 shows a detail of an aircraft air-conditioning system 10 comprising an air-conditioning unit 12, to which hot bleed air under increased pressure is supplied through a first engine bleed-air line 14. In the air-conditioning unit 12 the bleed air is expanded and cooled to a desired low temperature. The air conditioned in the air-conditioning unit 12 is finally directed through a main fresh-air line 16 into a mixer 18, where it is mixed with recirculated air extracted from a passenger cabin of the aircraft. The mixed air produced in the mixer 18 from cold fresh air supplied by the air-conditioning unit 12 and from recirculated air extracted from the aircraft cabin is finally used to air-condition various air-conditioning zones, in particular the passenger cabin of the aircraft.

Individual air-conditioning zones of the aircraft, for example individual hold regions or the cockpit should however be supplied with fresh air independently of recirculated air. For this purpose a fresh-air branch line 20 is provided, which is connected to the main fresh-air line 16 upstream of the mixer 18, i.e, upstream of a region, in which the fresh air flowing through the main fresh-air line 16 is mixed with recirculated air. Because of the relatively low fresh air requirement of the aircraft is regions to be supplied with fresh air by the fresh-air branch line 20, the fresh-air branch line 20 has a flow cross section that is smaller than a flow cross section of the main fresh-air line 16.

In a region of connection of the main fresh-air line 16 to the fresh-air branch line 20 the main fresh-air line 16 is of a curved design so that a main fresh air flow flowing through the main fresh-air line 16 is deflected. In contrast thereto, the fresh-air branch line 20 in the region of connection of the main fresh-air line 16 to the fresh-air branch line 20 extends in a direction that corresponds to the flow direction of the fresh air through the main fresh-air line 16 upstream of the region of connection of the main fresh-air line 16 to the fresh-air branch line 20, so that a fresh air branch flow flowing through the fresh-air branch line 20 experiences substantially no deflection.

This development of the region of connection of the main fresh-air line 16 to the fresh-air branch line 20 prevents the occurrence of regions in the fresh-air branch line 20 where the fresh air branch flow directed through the fresh-air branch line 20 has a reduced flow rate. It is thereby possible markedly to reduce the risk of the attachment of ice and/or snow in the fresh-air branch line 20 in the event of a corresponding temperature and a corresponding moisture content of the fresh air flowing through the region of connection of the main fresh-air line 16 to the fresh-air branch line 20. Admittedly, in the curved main fresh-air line 16 the occurrence of regions where the main fresh air flow flowing through the main fresh-air line 16 has a reduced flow rate is not ruled out. However, the— compared to the flow cross section of the fresh-air branch line 20—markedly larger flow cross section of the main fresh-air line 16 lowers the risk of ice and/or snow attaching in the main fresh-air line 16 in the region of connection of the main fresh-air line 16 to the fresh-air branch line 20.

The aircraft air-conditioning system 10 further comprises an electronic control unit 22 that is adapted to perform various control functions during operation of the air-conditioning system 10. For example, the electronic control unit 22 may control a valve 26 disposed in a second engine bleed-air line 24. The second engine bleed-air line 24 opens out into the main fresh-air line 16 downstream of the air-conditioning unit 12 and upstream of the region of connection of the main fresh-air line 16 to the fresh-air branch line 20. Through suitable control of the valve 26 the electronic control unit 22 is therefore able to control the supply of warm engine bleed air into the main fresh-air line 16. The electronic control unit 22 is further adapted to control the operation of the air-conditioning unit 12. Finally, the electronic control unit 22 is used to control a heating device 28, which is disposed in the region of connection of the main fresh-air line 16 to the fresh-air branch line 20 and is capable of purposeful and locally selective heating of the region of connection of the main fresh-air line 16 to the fresh-air branch line 20.

The electronic control unit 22 receives signals from sensors, which are not represented in the figures and which measure the static pressure in the main fresh-air line 16 and the fresh-air branch line 20. The electronic control unit 22 is further connected to sensors for measuring the temperature in the mixer 18 and in a region of the aircraft that is supplied with fresh air by the fresh-air branch line 20. If the static pressure measured by the pressure sensors in the main fresh-air line 16 and/or the fresh-air branch line 20 exceeds a predetermined threshold value and/or if the temperature measured by the temperature sensors in the mixer 18 and/or in the region of the aircraft supplied with fresh air by the fresh-air branch line 20 exhibits a predetermined characteristic, the electronic control unit 22 evaluates this as an indication of icing of the region of connection of the main fresh-air line 16 to the fresh-air branch line 20.

In response to the detection of icing of the region of connection of the main fresh-air line 16 to the fresh-air branch line 20, the electronic control unit 22 may then execute various control functions. One control option is to open the valve 26 disposed in the second engine bleed-air line 24 so that warm engine bleed air is supplied to the main fresh-air line 16. As a result, the region of connection of the main fresh-air line 16 to the fresh-air branch line 20 is heated by the supply of warm air through the main fresh-air line 16. In order to avoid an excessive impairment of the cooling capacity of the aircraft air-conditioning system 10 and hence of the comfort of the passengers and crew on board the aircraft, these heating periods should however be kept as short as possible. For example, the electronic control unit 22 may close the valve 26 disposed in the second engine bleed-air line 24 again as soon as the sensors indicate a normalizing of the pressure- and temperature values measured by them.

Alternatively or in addition thereto, the electronic control unit 22 may start operation of the heating device 28 and hence initiate a purposeful heating of the region of connection of the main fresh-air line 16 to the fresh-air branch line 20. The heating is device 28 may be for example an electric heating device. A heating device 28 that is particularly energy-efficient to operate is however represented in FIG. 3.

According to FIG. 3 the heating device 28 comprises a recirculated-air line 30 for recirculating filtered cabin air of the aircraft. In the region of connection of the main fresh-air line 16 to the fresh-air branch line 20 the fresh-air branch line 20 extends through the recirculated-air line 30. In other words, where necessary, warm recirculated air that is flowing through the recirculated-air line 30 may flow around the fresh-air branch line 20. The recirculated-air line 30 opens out into the main fresh-air line 16, so that a mixture of fresh air and recirculated air flows through the main fresh-air line 16 downstream of the region of connection of the main fresh-air line 16 to the fresh-air branch line 20.

In order to enable an optimum heat transfer from the recirculated air flowing through the recirculated-air line 30 to the fresh-air branch line 20, the fresh-air branch line 20 in the region, in which it extends through the recirculated-air line 30, is uninsulated, i.e. not provided with an insulating sheath. A purposeful heating of the fresh-air branch line 20 in the arrangement represented in FIG. 3 is possible through control of a valve, which is not represented and is disposed in the recirculated-air line 30, by means of the electronic control unit 22.

Finally, the electronic control unit 22 is capable of controlling the operation of the air-conditioning unit 12 and/or the supply of warm air into the main fresh-air line 16 downstream of the air-conditioning unit 12 and upstream of the region of connection of the main fresh-air line 16 to the fresh-air branch line 20 in such a way that the temperature of the air flowing through the region of connection of the main fresh-air line 16 to the fresh-air branch line 20 does not fall below a first predetermined temperature value $T_1$ in the range between 0° C. and 5° C. In this way, icing of the region of connection of the main fresh-air line 16 to the fresh-air branch line 20 may be reliably avoided. Such a control of the aircraft air-conditioning system is appropriate particularly when the cooling capacity requirement demanded of the aircraft air-conditioning system 10 is not excessively high, for example when the aircraft is operating on the ground at moderate ambient temperatures.

As an alternative thereto, the control unit may control the operation of the air-conditioning unit 12 and/or the supply of warm air into the main fresh-air line 16 downstream of the air-conditioning unit 12 and upstream of the region of connection of the main fresh-air line 16 to the fresh-air branch line 20 also in such a way that the temperature of the air flowing through the region of connection of the main fresh-air line 16 to the fresh-air branch line does not exceed a second predetermined temperature value $T_2$ in the range between −15° C. and −10° C. Good dehumidification of the air may then be achieved in the air-conditioning system 10, so that by virtue of supplying relatively dry fresh air into the region of connection of the main fresh-air line 16 to the fresh-air branch line 20 the risk of icing in this region may be reduced. Such a control of the aircraft air-conditioning system 10 is appropriate for example when the cooling capacity requirement on board the aircraft is relatively high and, in the event of an adjustment of the temperature of the air flowing through the region of connection of the main fresh-air line 16 to the fresh-air branch line 20 to a value above the first predetermined temperature value $T_1$, may occasionally not be met.

Figure 2:
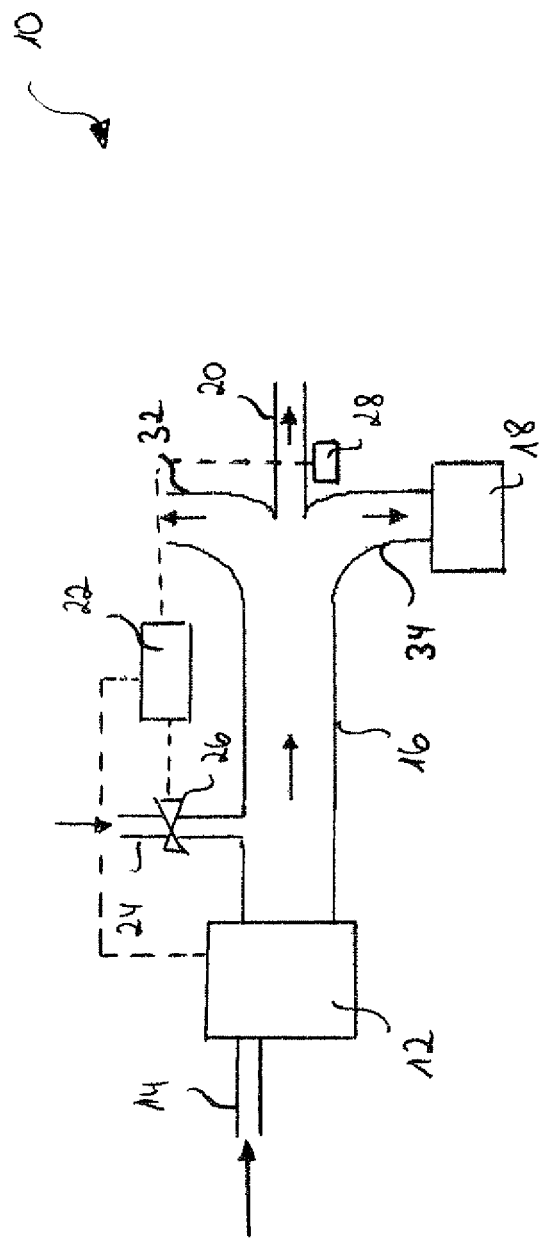
FIG. 2 a detail of a second embodiment of an aircraft air-conditioning system and FIG. 3 a detail view of a region of connection of a main fresh-air line to a fresh-air branch line in an aircraft air-conditioning system.

FIG. 2 shows an embodiment of an aircraft air-conditioning system 10 that differs from the arrangement represented in FIG. 1 in that the main fresh-air line in the region of connection of the main fresh-air line 16 to the fresh-air branch line 20 branches into a first main fresh-air line branch 32 and a second main fresh-air line branch 34. The first main fresh-air line branch 32 and the second main fresh-air line branch 34 are each of a curved design so that the main fresh air branch flows flowing through these line branches 32, 34 are deflected in the region of connection of the main fresh-air line 16 to the fresh-air branch line 20. The fresh-air branch line 20, on the other hand, extends once again in a direction that corresponds to the flow direction of the fresh air flow through the main fresh-air line 16 upstream of the region of connection of the main fresh-air line 16 to the fresh-air branch line 20, so that the fresh air branch flow flowing through the fresh-air branch line 20 experiences substantially no deflection in the region of connection of the main fresh-air line 16 to the fresh-air branch line 20.

In order to reduce the risk of icing in the region of connection of the branching main fresh-air line 16 to the fresh-air branch line 20, the first main fresh-air line branch 32 and the second main fresh-air line branch 34 each have a flow cross section that is larger than the flow cross section of the fresh-air branch line 20. Otherwise, the construction and mode of operation of the aircraft air-conditioning system 10 shown in FIG. 2 correspond to the construction and mode of operation of the arrangement according to FIG. 1.

The invention claimed is:

1. An aircraft air-conditioning system, comprising:
    an air-conditioning unit that is connected by a main fresh-air line to a mixer in order to supply the mixer with fresh air at a desired low temperature, the mixer supplying a mixture of the fresh air flowing through the main fresh-air line and recirculation air extracted from a passenger cabin to a first zone of the aircraft, and
    a fresh-air branch line that is connected upstream of the mixer to the main fresh-air line, wherein the fresh-air branch line has a flow cross section that is smaller than a flow cross section of the main fresh-air line,
    wherein the main fresh-air line and the fresh-air branch line proximate the connection of the main fresh-air line to the fresh-air branch line are so formed that a main fresh air flow flowing through the main fresh-air line to the mixer is deflected, while a fresh air branch flow flowing through the main fresh-air line and the fresh-air branch line experiences substantially no deflection.

2. The aircraft air-conditioning system according to claim 1, wherein the main fresh-air line proximate the connection of the main fresh-air line to the fresh-air branch line branches into a first main fresh-air line branch and a second main fresh-air line branch, wherein the first main fresh-air line branch and the second main fresh-air line branch each have a flow cross section that is larger than the flow cross section of the fresh-air branch line.

3. The aircraft air-conditioning system according to claim 1, wherein the fresh-air branch line is uninsulated in the region of connection of the main fresh-air line to the fresh-air branch line.

4. The aircraft air-conditioning system according to claim 1, wherein the fresh air branch flow that flows through the fresh-air branch line is supplied to a second zone of the aircraft different than the first zone without being mixed with the recirculation air and without deflection while flowing from the main fresh-air line into the fresh-air branch line.

5. The aircraft air-conditioning system according to claim 1, further comprising:
    a control unit, which controls the operation of the air-conditioning unit and/or a supply of warm air into the main fresh-air line downstream of the air-conditioning unit and upstream of the region of connection of the main fresh-air line to the fresh-air branch line in such a way that the temperature of an air flowing through the region of connection of the main fresh-air line to the fresh-air branch line does not fall below a first predetermined temperature value.

6. The aircraft air-conditioning system according to claim 5, wherein the first predetermined temperature value is in a range between 0° C. and 5° C.

7. The aircraft air-conditioning system according to claim 1, further comprising:
    a control unit, which is adapted to control the operation of the air-conditioning unit and/or a supply of warm air into the main fresh-air line downstream of the air-conditioning unit and upstream of the region of connection of the main fresh-air line to the fresh-air branch line in such a way that the temperature of an air flowing through the region of connection of the main fresh-air line to the fresh-air branch line does not exceed a second predetermined temperature value.

8. The aircraft air-conditioning system according to claim 7, wherein the second predetermined temperature value is in a range between −15° C. and −10° C.

9. The aircraft air-conditioning system according to claim 1, further comprising:
    a heating device, which selectively heats at least one of the main fresh-air line and the fresh-air branch line in the region of connection of the main fresh-air line to the fresh-air branch line.

10. The aircraft air-conditioning system according to claim 9, further comprising:
    a control unit, which controls the heating device in dependence on at least one measured parameter that indicates icing of the region of connection of the main fresh-air line to the fresh-air branch line, wherein the measured parameter is characteristic of at least one of a static pressure in the main fresh-air line, a static pressure in the fresh-air branch line, and a temperature in a region of the aircraft that is connected to the main fresh-air line or the fresh-air branch line downstream of the region of connection of the main fresh-air line to the fresh-air branch line.

11. The aircraft air-conditioning system according to claim 9, wherein the heating device selectively heats the region of connection of the main fresh-air line to the fresh-air branch line in a purposeful and locally selective manner.

12. The aircraft air-conditioning system according to claim 9, wherein the heating device comprises a line, through which a heat transfer fluid flows, and that the fresh-air branch line in the region of connection of the main fresh-air line to the fresh-air branch line extends through the line, through which the heat transfer fluid flows.

13. The aircraft air-conditioning system according to claim 12, wherein the line, through which the heat transfer fluid flows, is a recirculated-air line for recirculating filtered air from a passenger cabin of the aircraft.

14. An aircraft air-conditioning system, comprising:
an air-conditioning unit that is connected by a main fresh-air line to a mixer in order to supply the mixer with fresh air at a desired low temperature, and
a fresh-air branch line that is connected upstream of the mixer to the main fresh-air line, wherein the fresh-air branch line has a flow cross section that is smaller than a flow cross section of the main fresh-air line, and
a heating device, which is adapted to heat at least one of the main fresh-air line and the fresh-air branch line in a region of connection of the main fresh-air line to the fresh-air branch line, wherein the heating device comprises a line, through which a heat transfer fluid flows, and that the fresh-air branch line in the region of connection of the main fresh-air line to the fresh-air branch line extends through the line, through which the heat transfer fluid flows,
wherein the main fresh-air line and the fresh-air branch line in the region of connection of the main fresh-air line to the fresh-air branch line are so formed that a main fresh air flow flowing through the main fresh-air line is deflected, while a fresh air branch flow flowing through the fresh-air branch line experiences substantially no deflection, and
wherein the line, through which the heat transfer fluid flows, opens out into the main fresh-air line in the region of connection of the main fresh-air line to the fresh-air branch line.

15. An aircraft air-conditioning system, comprising:
an air-conditioning unit that is connected by a main fresh-air line to a mixer in order to supply the mixer with fresh air at a desired low temperature, the mixer supplying a mixture of the fresh air flowing through the main fresh-air line and recirculation air extracted from a passenger cabin to a first zone of the aircraft, the main fresh-air line including a bent portion in the form of a T-shaped junction or L-shaped junction, and
a fresh-air branch line that is connected upstream of the mixer to the main fresh-air line, wherein the fresh-air branch line has a flow cross section that is smaller than a flow cross section of the main fresh-air line, and wherein the fresh-air branch line extends across the bent portion and the fresh-air branch line defines an inlet located upstream from the bent portion such that the fresh-air branch line communicates with the main fresh-air line upstream from the bent portion, thereby causing a main fresh air flow flowing through the main fresh-air line to be deflected when flowing through the bent portion, while a fresh air branch flow flowing through the fresh-air branch line experiences substantially no deflection.

* * * * *